United States Patent [19]
Lenz et al.

[11] 3,880,179
[45] Apr. 29, 1975

[54] METHOD FOR THE EFFECTIVE DISPENSATION OF OXIDATION-AND/OR MOISTURE-SENSITIVE MATERIALS

[75] Inventors: Arnold Lenz, Gerstenkamp; Walter Rogler, Bonn, both of Germany

[73] Assignee: Dynamit Nobel Aktiengesellschaft, Troisdorf, Germany

[22] Filed: Nov. 14, 1973

[21] Appl. No.: 415,796

Related U.S. Application Data

[63] Continuation-in-part of Ser. No. 173,599, Aug. 20, 1971, abandoned, which is a continuation-in-part of Ser. No. 786,060, Dec. 23, 1968, abandoned.

[30] Foreign Application Priority Data
Dec. 23, 1967  Germany.......................... 1667010

[52] U.S. Cl. ..................... 137/14; 137/209; 141/1; 222/1
[51] Int. Cl................................ F04f 1/14
[58] Field of Search........... 137/1, 2, 7, 12, 14, 209, 137/251; 141/1, 67, 90, 91; 222/1, 53, 152, 159, 396, 399

[56] References Cited
UNITED STATES PATENTS

| | | | |
|---|---|---|---|
| 655,623 | 8/1900 | Harriman........................ | 137/251 X |
| 3,129,730 | 4/1964 | Simon............................ | 222/159 X |
| 3,380,462 | 4/1968 | Schieber et al................. | 137/209 X |

Primary Examiner—Alan Cohan
Assistant Examiner—Gerald A. Michalsky
Attorney, Agent, or Firm—Craig & Antonelli

[57] ABSTRACT

A method for effecting the conveyance of oxidation-sensitive powdery materials from a storage tank to another vessel, for example a reaction vessel, with a protective gas that serves to transport the powdery material.

8 Claims, 4 Drawing Figures

PATENTED APR 29 1975

INVENTORS
ARNOLD LENZ
WALTER ROGLER

BY Craig, Antonelli & Hill
ATTORNEYS

METHOD FOR THE EFFECTIVE DISPENSATION OF OXIDATION-AND/OR MOISTURE-SENSITIVE MATERIALS

CROSS-REFERENCE TO RELATED APPLICATIONS

This is a continuation-in-part application of applicants' copending application, Ser. No. 173,599 filed on Aug. 20, 1971, now abandoned which application is a continuation-in-part of abandoned application Ser. No. 786,060 filed on Dec. 23, 1968.

BACKGROUND OF THE INVENTION

The present invention relates to a method for the reliable and effective conveyance of oxidation-sensitive and/or moisture-sensitive materials, particularly flowable powdery substances, under an atmosphere of a protective gas from a storage tank which can be sealed off in a gas-tight manner through a conveying line into a reaction vessel or other means connected thereto.

As is well known, there are a large number of powdery substances which become unstable due to the effect of contact with oxygen in atmospheric air, or by hydrolysis with the moisture in the air. Examples of such powdery materials include the hydrides of the alkali metals and alkaline earth metals. By using these metals in industrial manufacturing processes in chemical reaction with the corresponding halogenides, other hydrides are produced, alcohol-free alcoholates are prepared and also condensation reactions are conducted. In order for the above-mentioned reactions to take place satisfactorily, contamination with foreign substances, particularly oxygen and atmospheric moisture, must be avoided. Furthermore, the dispensation of the reaction-sensitive substances, such as for example, sodium hydride powder, which can be conveyed in the flowable phase, must be conducted so that these substances can be metered in as effective, rapid and reliable a manner as possible. Also, the greatest degree of cleanliness must likewise be observed. Therefore, the problem exists as to how, in as an effective manner as possible, to introduce the required atmosphere of protective gas, as well as the conveyance of the corrosive or caustic material to the desired location.

SUMMARY OF THE INVENTION

An object of the present invention is to avoid the prior art disadvantages in conveying oxidation-sensitive and/or moisture-sensitive materials from a storage tank to another location.

Another object of the present invention is to provide a method for conveying oxidation-sensitive and/or moisture-sensitive materials from one location to another without the materials being contacted with the atmosphere.

A further object of the present invention is to provide an improved method for effecting the conveyance of the sensitive materials from a storage tank to a reaction vessel which is inexpensive and simple.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved method for conveying the sensitive powder materials from a storage tank to another location may be obtained in an effective manner by the use of an inert compressed gas in conjunction with a detachable conduit means including check valve means, said conduit means being threadedly attached to the upper portion of a storage tank containing the sensitive powder material without allowing the atmosphere to contact the sensitive material. First of all, a first conduit means is threadedly attached to a first threaded plug closure disposed in the upper portion, for example in the lid, of the storage tank. A nonreturn spring-loaded valve is located in the closure to allow entry of gas only when the first conduit means is attached to the tank. A stream of protective gas is then introduced through the first conduit means into the storage tank containing the oxidation-sensitive and/or moisture-sensitive material to be conveyed. The stream of protective gas, for example an inert gas such as nitrogen, helium, argon and the like, produces a slight superatmospheric pressure in the system, this pressure being indicated by a pressure indicating means communicating with the first conduit means. Thus the contents of the storage tank is exposed to a weak pressure of inert gas.

Thereafter, a second threaded closure in the upper portion of the storage tank is removed thereby providing a purge stream of protective gas through the top of said tank. A guide sleeve is threadedly connected in place of the second closure and a pipe insert with a second conduit means connected thereto is introduced through this sleeve until it reaches the lower portion of the storage tank. Then the flow of gas to the pressure indicating means is stopped, and the material in the tank which is now permeated by the protective gas, is conveyed in a pneumatic manner through the second conduit means into the reaction vessel by increasing the pressure of the inert gas introduced via the first conduit means.

When employing the method of the present invention, the compressed gas is utilized, in an advantageous manner, for exposing the contents of the tank to a weak gas pressure, for purging the tank when connecting the conveying conduit, and for conveying the material from the tank to the desired reaction vessel or other location.

The method described above can be effectively conducted and controlled by connecting a hydrostatic pressure indicating device having an immersion tube and an oil bath to the first conduit means, by providing on the upstream side of said device a pressure gauge or manometer, and by providing the second conduit means or conveying conduit with a grounding cable. Advantageously, the conveying conduit means is made of a transparent synthetic material, such as for example polyethylene, polypropylene, polyvinyl chloride, polytetrafluoroethylene, silicone rubber, and the like.

It has been found that this method is suitable for certain granular and/or powdery material sensitive to oxidation and/or moisture, and particularly to those having specific minimum grain sizes, or particle size so that sufficiently large interstices be formed between the mutually touching grains, which interstices are filled with the protective or inert gas which serves to transport the powdery material. It is only on the basis of this prerequisite, in fact, that a mixture of protective gas and grains or particles can be fed from the storage tank. In this way the gas acts directly as transporting medium by virtue of the fact that it feeds or transports the grains in mixture with it out of the storage tank. The minimum particle size of the powdery materials is approximately 100 $\mu$ for sodium hydride. Also, to effect an optimal conveyance by means of the protective gas flow or current, there exists also an upper particle size limit which is approximately 1,000 $\mu$ for sodium hydride. Generally, this range of particle size is also suitable for other alkali metal hydrides and alkaline earth metal hydrides.

BRIEF DESCRIPTION OF THE DRAWINGS

The present invention will become more fully understood from the following detailed description and the accompanying drawings wherein.

FIG. 4 is a vertical sectional view showing one embodiment of a guide sleeve and pipe insert within a second threaded closure of the invention. valve (a

DESCRIPTION OF THE PREFERRED EMBODIMENTS

Figure 1:
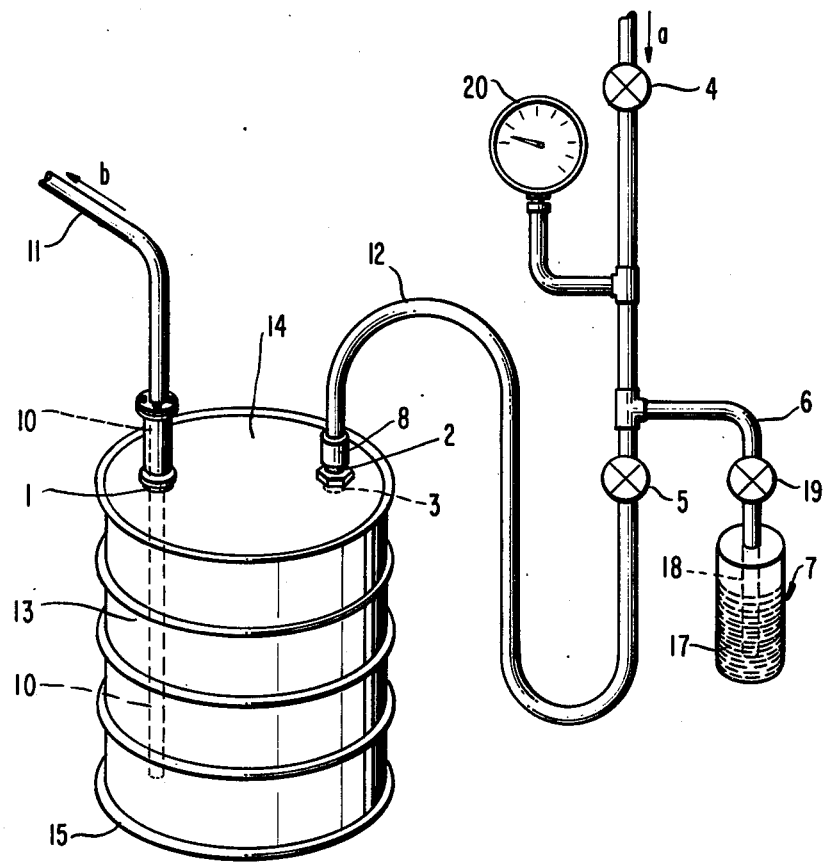
FIG. 1 shows in a diagrammatic manner the apparatus for carrying out the method of the present invention for effecting the conveyance of sensitive powder materials from a storage tank to another location.

Referring now to the drawing, the apparatus comprises a gas-tight tank 13 which contains an oxidation-sensitive flowable material, e.g., sodium hydride. The tank is provided with two threaded closures (or screw plugs) 1 and 2 disposed in lid 14. In the first threaded closure 2, a spring-loaded check valve (a non-return, back-pressure valve) 3 is disposed. The protective gas line 12 forms a first conduit means which communicates with a source of compressed inert gas, for example a gas bottle of argon, not shown. This line is provided with a main slide valve 4 and an operating slide valve 5. The protective gas line is also provided with a threaded fitting closure or connection 8 at the point where the gas line is connected to the storage tank. The connection 8 causes valve 3 to open when it is attached to the first threaded closure. For measuring the pressure in line 12, a manometer 20 is provided.

Also, a hydrostatic pressure indicating device 7 communicates with the protective gas line via a branched conduit 6 to indicate an excessive pressure in the system before the conveyance of the oxidation-sensitive material from tank 13 is commenced. The hydrostatic pressure indicating device 7 has an oil bath 17 into which is extended an immersion pipe 18 which communicates with the protective gas line 12 through slide valve 19 and the conduit 6. This device also serves to relieve the gas pressure in the first conduit means by allowing the gas directed into the oil bath to escape in the form of bubbles to the atmosphere.

A guide sleeve 9 is connected to the threaded closure 1 by threading it thereon. Through this guide sleeve a pipe insert 10 connected to the conveying conduit 11 is secured to the tank in a gas-tight manner. The pipe insert can be extended through the contents of the tank down to the lower portion or bottom 15 of the tank.

Figure 2:
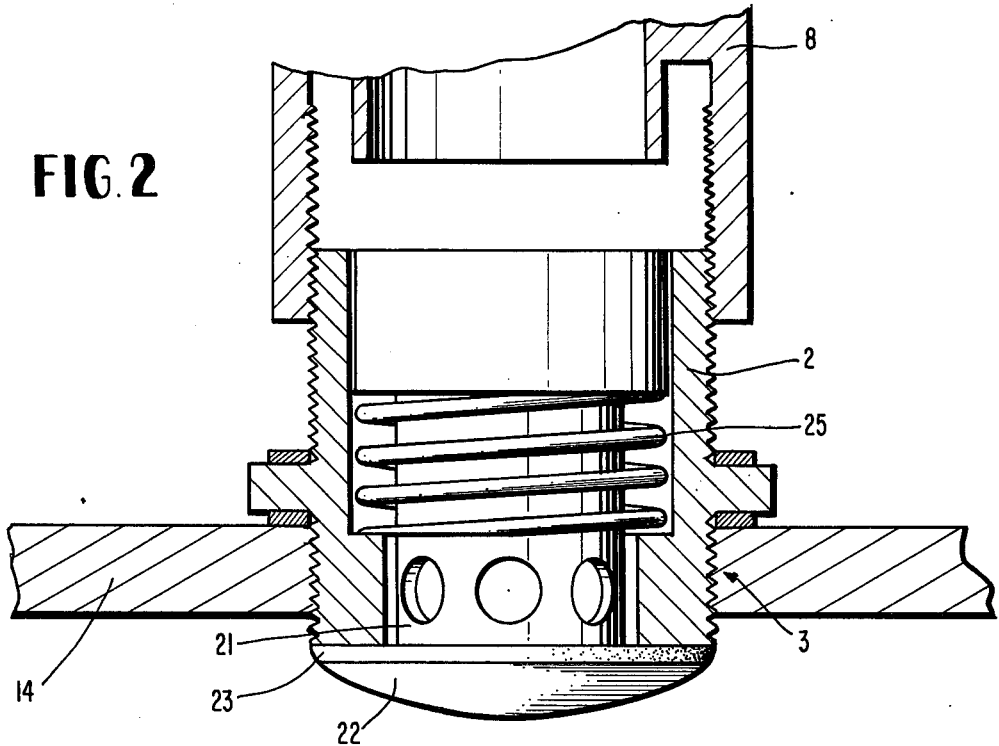
FIGS. 2 and 3 are vertical sectional views of a first threaded closure and an embodiment of a spring-loaded valve of the invention in the closed and open positions, respectively.
Figure 3:
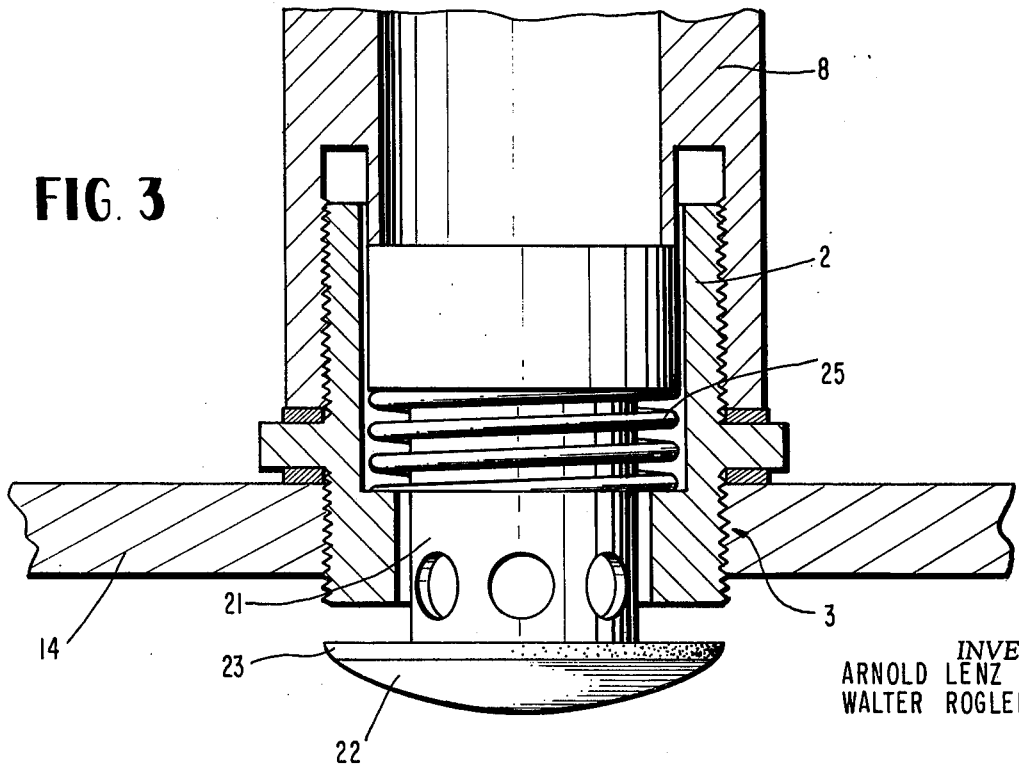

FIGS. 2 and 3 illustrate the arrangement of relief valve 3 within the first threaded closure 2. As shown, closure 2 includes a tubular member threaded in lid 14.

The upper exterior portion of closure 2 is threaded to engage a threaded sealing cap (not shown) or the fitting connection 8. Closure 2 also has an internal bore for receiving a piston-like tubular element 21 of valve 3. This element has an end flange 22 provided with an annular seal 23 which engages the lower portion of closure 2 when the valve 3 is closed. Openings in the lower portion of element 21 direct gas entering the top of the element out between the seal 23 and closure 2 when the valve is open.

A spring 25 is provided for biasing the element 21 into the closed position shown in FIG. 2.

When connection 8, attached to pipe 12, is threaded onto closure 2, in a fluid-tight manner, it partially opens valve 3 by pressing element 21 downwardly against the bias of spring 25.

Figure 4:
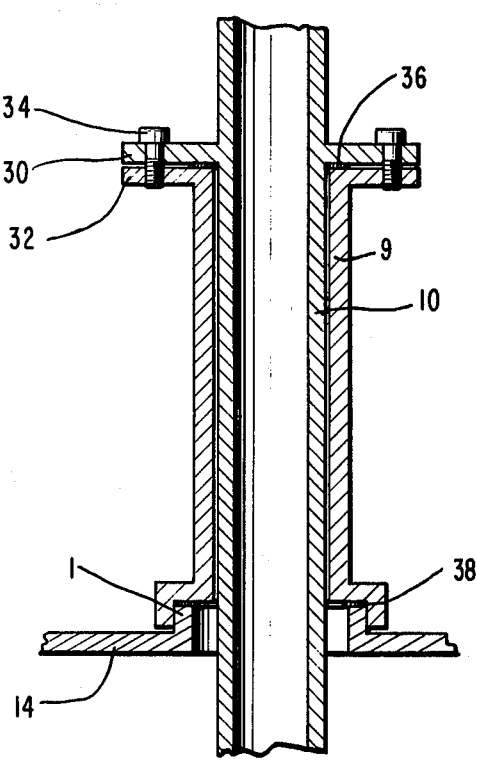

In FIG. 4, guide sleeve 9 is shown secured to the lid 14 of the tank by threadedly engaging the threaded closure 2. Pipe insert 10 is connected to the guide sleeve by means of a flange 30 which is secured to flange 32 of the sleeve by screws 34. Annular gaskets 36 and 38 are provided to insure a fluid-tight fitting between the pipe insert, the guide sleeve, and the threaded closure.

The apparatus as illustrated in the drawing in the operative condition can be manipulated as follows. First, the main slide valve 4 is cautiously opened and the entire first conduit means is purged with the protective gas, the slide valves 5 and 19 likewise being open. Then a sealing cap on the threaded closure 2 (which is not illustrated) is removed and the check valve 3 is partially opened by securing the threaded closure 8 onto the closure 2. This places the protective gas line 12 in communication with tank 13.

The existence of gas bubbles in the oil bath 17 of the hydraulic pressure indicating device 7 reveals the presence of excess pressure in the first conduit means, which at first is only a minor amount. This excess pressure can readily be set in such a manner that the check valve 3 is further opened, and the contents of the tank are exposed to a weak pressure of the protective gas. When the cap of the threaded closure 1 is thereafter removed, a purging stream of protective gas is initiated and is maintained until the guide sleeve 9 has been firmly threaded onto the closure 1 and the pipe insert 10 has been introduced therethrough and inserted down to the bottom 15 of the tank. Now, the slide valve 19 is closed so that flow of gas to device 7 is stopped, the main slide valve 4 is further opened, and the stream of protective gas entering in the direction of the arrow $a$ builds up an excess pressure which can be read off of the manometer 20.

The excess pressure of the protective gas is communicated by way of the protective gas line 12 into the storage tank 13 and presses the flowable powdery material or liquid material therein through the pipe insert 10 and the conveying conduit 11 connected thereto in the direction of the arrow $b$ to a reaction vessel, which is not shown. Advantageously, the conveying conduit 11 is made of a transparent thermoplastic synthetic material which permits an optical monitoring of the conveying method. Additionally, the conveying conduit can be equipped with a grounding cable which protects the apparatus against spark ignition in the situation where flammable substances are being conveyed. The use of the manometer 20 and the hydrostatic pressure indicating device 7 also facilitates the optical control of the method. The conveying procedure is terminated in an effective manner by actuating the appropriate slide valves in the protective gas line and disassembling the above-described connecting elements from the storage tank 13 in a reverse order from that of the assembly.

The expenditure for conducting the method of the present invention is very minor, the manipulation of the elements of the apparatus is very simple and the protection against oxygen and atmospheric moisture is effectively maintained.

EXAMPLE

By employing the apparatus shown in the drawings, sodium hydride having a particle size of approximately 500 $\mu$ is discharged with nitrogen from a 40 k.g. storage tank under a pressure of from about 0.5 to 1 atmosphere gauge in a period of from 15 to 20 minutes. The sodium hydride has a sand-colored appearance, is dust-free and exhibits a cubic-free centered crystal structure. The flow rate of the nitrogen gas ranges from about 10 liters to 30 liters per minute.

While the principles of the invention have been described heretofore with reference to specific embodiments, it will be understood that this description is intended only to be illustrative and not limiting on the scope of the invention.

What is claimed is:

1. A method for conveying an oxidation-sensitive and/or moisture-sensitive free-flowing powder material from an air-tight storage tank means to another vessel without exposing said material to the stmosphere, which comprises successively introducing an inert gas into a first conduit means to purge the surrounding atmosphere from said conduit means, attaching said first conduit means to a closure means of the storage tank, attachment of said first conduit means placing said conduit means in communication with the material in said tank; introducing said inert gas into said storage tank to place the material under a slight excess pressure; limiting the pressure in said storage tank by venting some gas to atmosphere; detachably connecting a second conduit means to said storage tank while said inert gas is being introduced through said first conduit means, placing second conduit means in communication with the other vessel; and introducing the inert gas through first conduit means into said storage tank at a higher pressure sufficient to force the sensitive powder material in the storage tank through the second conduit means together with said inert gas into said other vessel.

2. The method fo claim 1, in which said inert gas is selected from the group consisting of nitrogen, helium, and argon.

3. The method of claim 2, in which the oxidation and/or moisture-sensitive powder material is an alkali metal hydride or alkaline earth metal hydride having a particle size of from 100 to 1,000 $\mu$.

4. The method of claim 3, in which the higher pressure is in the range of from about 0.5 to about 1 atmosphere gauge.

5. The method of claim 4, in which the rate of discharge of the material from the tank ranges from about 120 to about 160 K.g. per hour.

6. The method of claim 2, in which the moisture-sensitive material is sodium hydride having a particle size of from 100 to 1,000 $\mu$.

7. A method for conveying an oxidation-sensitive and/or moisture-sensitive material from an air-tight storage tank to another vessel without exposing said material to the atmosphere, which comprises the successive steps of introducing an inert gas into a first conduit means to purge the surrounding atmosphere from said conduit means, attaching said first conduit means to a first closure means in the lid of a storage tank, said closure means being provided with a normally closed valve means which is operatively associated with said conduit means whereby attachment of said conduit means causes said valve means to open; introducing said inert gas into said storage tank to place the material under a slight excess pressure; said excess pressure being limited by a pressure indicating means which communicates with said first conduit means, said pressure indicating means optically indicating said excess pressure and relieving said excess pressure by venting said gas to atmosphere; removing a second closure means from the lid of said storage tank to provide an opening that allows a purging stream of said inert gas to flow through said tank and into the atmosphere; inserting a second conduit means into said tank via said opening whereby said stream of purging gas flows through said second conduit means; then further inserting said second conduit means into the sensitive material within said storage tank; detachably connecting said second conduit means to the lid of said storage tank while said inert gas is being introduced through said first conduit means, said second conduit means reaching the lower portion of the storage tank and extending from the tank to provide communication with the other vessel; stopping communication between said pressure indicating means and said first conduit means, and introducing the inert gas through first conduit means into said storage tank at a higher pressure sufficient to force the sensitive material in the storage tank up through the second conduit means into said other vessel.

8. The method of claim 7, in which said oxidation-sensitive and/or moisture-sensitive material is a free-flowing powder and said inert gas carries said powder from said storage tank via said second conduit means.

* * * * *